United States Patent [19]

Rumbaugh

[11] Patent Number: 4,885,865
[45] Date of Patent: Dec. 12, 1989

[54] GRAPHITE FIBER REINFORCED ROD CONSTRUCTION

[75] Inventor: James T. Rumbaugh, Tai Chung, Taiwan

[73] Assignee: Berkley, Inc., Spirit Lake, Iowa

[21] Appl. No.: 892,755

[22] Filed: Jul. 31, 1986

[51] Int. Cl.⁴ ............................................. A01K 87/00
[52] U.S. Cl. ................................................... 43/18.5
[58] Field of Search .............. 43/18.1, 18.5; 138/118, 138/124, 129, 140, 178; 156/166, 169, 171, 173

[56] References Cited

U.S. PATENT DOCUMENTS

| | | | |
|---|---|---|---|
| 2,571,717 | 2/1946 | Howard | 43/18.5 |
| 2,749,643 | 6/1956 | Scott | 43/18 |
| 3,260,010 | 5/1963 | Dubois | 43/18.5 |
| 3,953,637 | 4/1976 | Phillips | 43/18.5 |
| 4,043,074 | 8/1977 | Airhart | 43/18.5 |
| 4,061,806 | 12/1977 | Lindler | 43/18.5 |
| 4,283,446 | 8/1981 | McLain | 428/36 |
| 4,685,241 | 8/1987 | Foote | 43/18.5 |

FOREIGN PATENT DOCUMENTS 1349906 4/1974 United Kingdom .

Primary Examiner—Richard K. Seidel
Assistant Examiner—Michael William Starkweather
Attorney, Agent, or Firm—Faegre & Benson

[57] ABSTRACT

Resilient flexible fishing rods are disclosed which have a hollow curable resinous body reinforced with graphite or silicon carbide fibers aligned with the rod axis. The rods have good hoop and bending strength and good strength-to-weight ratios.

9 Claims, 1 Drawing Sheet

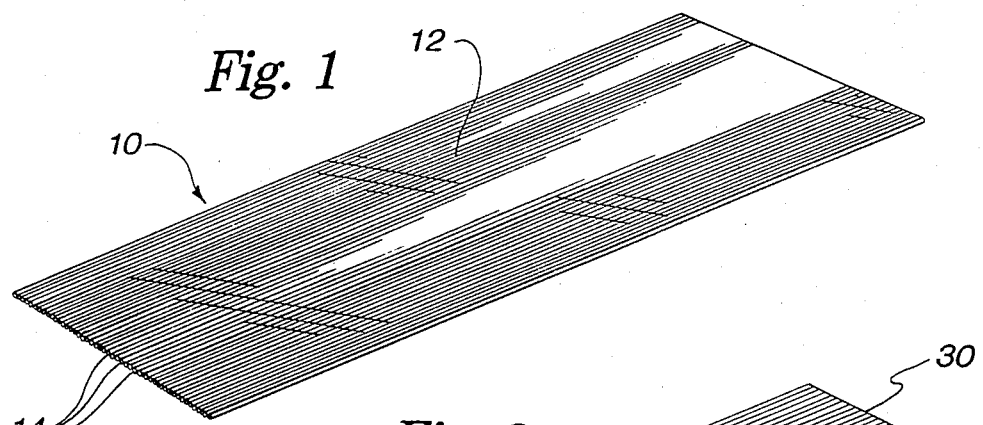
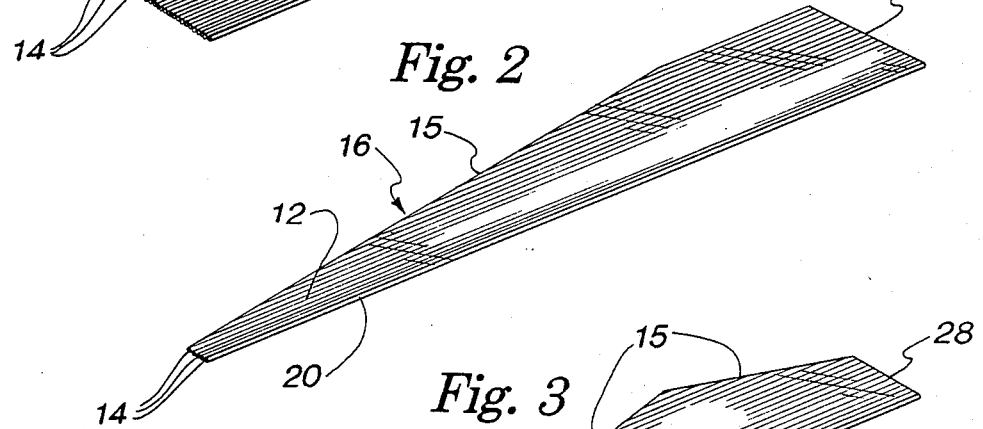
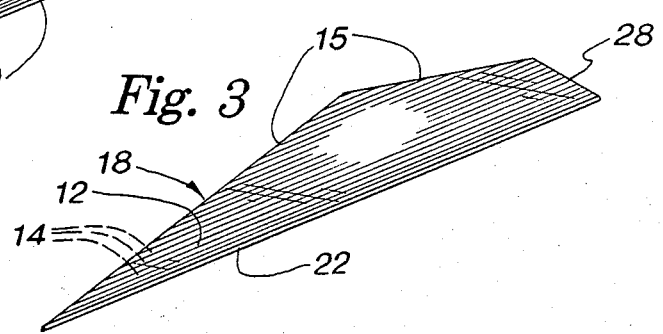
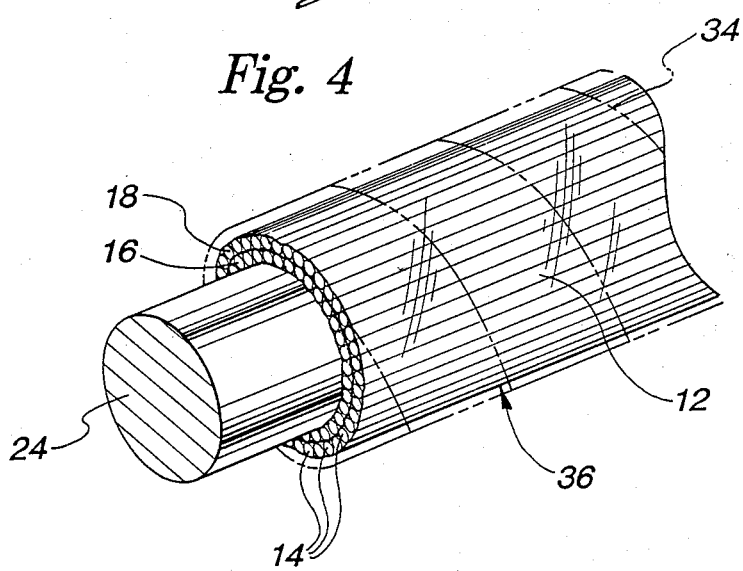

GRAPHITE FIBER REINFORCED ROD CONSTRUCTION

BACKGROUND OF THE INVENTION

This invention is directed to resinous rods reinforced with longitudinal graphite or silicon carbide fibers. More specifically, this invention is directed to tapered resilient flexible hollow fishing rods composed of a heat-curable resin matrix reinforced with unidirectional longitudinally aligned graphite or silicon carbide fibers.

The production of fiber-reinforced hollow rods, such as fishing rods, in recent years has involved wrapping fibers around a mandrel, employing an epoxy or other suitable curable resin as a binder. The fibers and resin may be formed directly onto the mandrel or may be available in the form of a woven or non-woven matrix which is cut to a suitable pattern and wrapped around the mandrel. The rod is then subjected to the required curing, after which the mandrel is removed leaving the hollow fishing rod blank.

In order to achieve specific characteristics in the rods, various types of fibers and various configurations of the fiber plies have been suggested. For example, U.S. Pat. No. 2,749,643 discloses a hollow shaft for fishing rods, having a surface ayer of longitudinally extending glass fibers and an inner layer of circumferentially wound glass fibers. The longitudinal fibers are disclosed to provide tension and compression strength, while the inner circumferentially wound fibers serve to retain the circular profile of the rod and maintain the moment of bending inertia of the shaft.

In the glass fiber reinforced rod of U.S. Pat. No. 3,260,010, two resinous layers, each having longitudinally aligned fibers, are superimposed so that the fibers of one layer form an acute angle with those of the other layer, and this dual layer is then wound about the mandrel to form the rod. This arrangement is said to provide hoop strength to ensure resistance to crushing in the rod, while the generally longitudinal alignment of the fibers is said to support the flexural stresses.

Graphite fibers are used to provide the reinforcement in the tapered hollow fishing rods of U.S. Pat. No. 4,043,074. The inner fiber-reinforced layers have the fibers aligned at an angle of 30 to 45 degrees to the axis of the rod. In the outer layers, the fibers extend generally parallel to the length of the rod. Due to the way in which the plies are rolled onto the tapered mandrel, the exterior fibers at the large diameter end of the rod align themselves at an increasing angle to the axis of the rod. U.S. Pat. No. 4,043,074 recognizes that rods of graphite fiber reinforcement exhibit a tendency to concentrate flexural forces near the large diameter handle end, unless the rod is made larger or heavier. However, U.S. Pat. No. 4,043,074 indicates that their arrangement of multiple layers of differently aligned fibers forms a rod of sufficient flexibility to resist breakage during flexure.

Both graphite and glass fibers have been used together to provide rod reinforcement, as illustrated in U.S. Pat. No. 4,061,806, wherein an inner layer of helically wound graphite fibers and an outer layer of longitudinally extending glass fibers are bonded together with a plastic resin. This arrangement of fibers is said to be required in order to provide both sufficient bending strength and necessary hoop or crushing strength to the rod.

SUMMARY OF THE INVENTION

We have now discovered that a flexible resilient tapered hollow rod of exceptional performance characteristics can be formed of exclusively unidirectional longitudinally aligned graphite or silicon carbide fibers bonded together in a heat-curable plastic resinous matrix. Surprisingly, these rods do not require fibers wound circumferentially in order to provide the required hoop strength for maintaining the essentially circular profile of the rod.

The method of forming the rods of this invention is quite simplified over methods for forming conventional rods of the prior patents discussed above. The rods of the present invention demonstrate highly desirable bending or flexure strength, as well as outstanding circumferential or hoop strength with less weight and thickness than has been possible with previous rods.

BRIEF DESCRIPTION OF THE DRAWINGS

FIG. 1 is a pictorial view showing the prepeg material of longitudinally aligned graphite or silicon carbide fibers in a synthetic heat-curable resinous material.

FIGS. 2 and 3, respectively, show patterns that are cut from the material of FIG. 1 used in forming the rod, as further described herein.

FIG. 4 is a fragmentary pictorial view of a section of the formed rod blank and mandrel.

DETAILED DESCRIPTION OF THE PREFERRED EMBODIMENTS

A flexible resilient hollow tapered fishing rod according to this invention is formed of unidirectional longitudinally aligned graphite or silicon carbide fibers bound together with a heat-curable plastic resinous matrix. According to an embodiment, the present fishing rod is formed by cutting a pattern from a prepeg material of suitably aligned graphite fibers in a heat-curable plastic resinous matrix and wrapping the pattern around a tapered mandrel. After appropriate curing, the mandrel is removed, leaving the rod blank.

The present invention eliminates the need for first preparing a separate layer of fibers wound circumferentially, such as required in U.S. Pat. Nos. 2,749,643 and 4,061,806, or angled to the axis of the rod, such as are required in U.S. Pat. Nos. 3,260,010 and 4,043,074.

Rod blanks according to this invention have been prepared and tested against similar rods using inner layers of circumferentially wound graphite fibers in a heat-curable plastic resinous matrix. The results of such testing demonstrates that the rods according to this invention are lighter in weight and have increased strength-to-weight ratio over the rods with interior circumferential graphite reinforcement. Advantageously, this novel rod construction will mean a lighter weight rod which will reduce user fatigue. Theoretically, the omission of the circumferential fibers, decreasing the mass of the rod system and removing the axial dampening characteristics of the circumferential fibers should tend to increase the sensitivity of the rod. Eliminating the need for the separate layer of differently aligned fibers will result in an economical reduction of the time, expense, materials and manpower required in manufacture of the rods.

Referring to FIG. 1, in the prepeg material 10, the heat-curable plastic synthetic resin 12 which forms the matrix is a thermosetting resin, heat curable to yield a hard, tough resinous product. Epoxy resins, those usually commercially available in fiber reinforced laminar materials, are preferred. The reinforcing fibers in the prepeg material are longitudinally aligned graphite or silicon carbide fibers 14. Preferably, the prepeg material 10 is an epoxy resin laminar material with longitudinally aligned graphite fiber reinforcement. The epoxy resin, graphite fiber reinforced laminar prepeg material 10, should suitably have a resin content of 40±3% by weight, a volatiles content at 325 degrees F. of at most 1% by weight, a gel time at 275 degrees F. of nominally 4 minutes and a graphite content of 140±5 grams per square meter. The thickness of a single cured ply should be nominally 0.0057 inch, when cured under a pressure of 8-10 psi, and nominally 0.0046 inch, when cured under a pressure of 85-100 psi. Suitable graphite fibers for use in this invention are commercially available under the tradenames, CELION, from Narmco Materials Inc., a subsidiary of Celanese Corp., and THORNEL, from Union Carbide Corp. Suitable prepeg material for present purposes is available under the tradename of RIGIDITE, also from Narmco Materials Inc., a subsidiary of Celanese Corp., containing CELION and THORNEL reinforcing graphite fibers in a thermosetting epoxy resin.

The patterns used in forming the present inventive fishing rod are cut from the laminar prepeg material 10 in size and shape appropriate to the desired rod blank. Suitable patterns for use in forming the rod of our invention are cut at 15 according to the generally right triangular patterns 16 and 18 shown in FIGS. 2 and 3, respectively. The contiguous parallel graphite fibers 14 of the laminar prepeg 10 are aligned with the longitudinal sides 20 and 22 of the patterns 16 and 18. The tapered steel mandrel 24 of FIG. 4 is coated with a mold release agent prior to wrapping with the prepeg patterns 16 and 18. The mandrel 24 is positioned atop the pattern 16 of laminar prepeg material 10 with the longitudinal side 20 of the pattern 16 aligned with the axis of the mandrel 24 and with the large diameter end of the mandrel at the wide end of the pattern. When the two patterns 16 and 18 are shown in FIGS. 2 and 3, respectively, are used, the pattern 16 of FIG. 2 is first wrapped once around the circumference of the mandrel 24. Then the pattern 18 of FIG. 3 is laid on top of the unrolled portion of the first section of the pattern 16, with the longitudinal edge 22 of the pattern 18 of FIG. 3 aligned with the axis of the mandrel 24 and with the large diameter end of the mandrel 24 of the wide end 30 of the pattern 18 of FIG. 3, and the rolling of the rod is completed. The exterior fibers at the larger diameter end of the rod may be aligned at a slightly decreased angle to the axis of the rod, due to the manner in which the pattern or patterns are rolled around the tapered mandrel, but the fibers are all generally unidirectionally longitudinally aligned to the axis of the rod, and essentially all of the fibers generally extend the length of the rod.

After wrapping of the mandrel 24 has been completed, an overlapping layer of plastic tape 34, suitably of Dupont TEDLAR, is wrapped around the mandrel 24 and patterns 16 and 18 to hold the patterns 16 and 18 securely in place during the heat curing operation. When the epoxy-graphite fiber prepeg 10 preferred for use in this invention is employed, an appropriate curing cycle would involve heating from room temperature to 170±5 degrees F., maintaining that temperature for 60 minutes, then raising the temperature to 275 degrees F., and maintaining the higher temperature for 60 minutes. The two curing temperatures can be attained at a heating elevation rate of 1-10 degrees F./minute.

After the curing process, the mandrel 24 and the retaining plastic tape overwrap 34 are removed, and the final finishing of the rod blank 36 is completed.

Having described our invention, what we desire to secure by Letters Patent is defined in the following claims:

1. A fishing rod having a flexible resilient hollow tapered body of generally circular exterior cross section, tapering from a large diameter handle end to a small diameter tip end, the rod having a hollow interior extending along the rod axis, tapering in the same direction as the exterior of the rod, the rod body being constructed of a laminar resinous matrix reinforced with continuous contiguous parallel graphite or silicon carbide fibers, with the fibers unidirectionally longitudinally aligned to the axis of the rod.

2. A fishing rod according to claim 1, wherein the resinous matrix is a heat-curable resin.

3. A fishing rod according to claim 2, wherein the heat-curable resin is an epoxy resin and the continuous contiguous parallel fibers are graphite.

4. A fishing rod according to claim 3, wherein the rod body is constructed of a plurality of plies of the laminar resinous matrix.

5. A method of forming a resinous graphite or silicon carbide fiber reinforced hollow tapered fishing rod blank of generally circular exterior cross section comprising the steps of:
providing a generally right triangular ply of a laminar resinous matrix reinforced with continuous contiguous parallel graphite or silicon carbide fibers,
the generally right triangular ply having a longitudinal side and a wide end and having the continuous contiguous parallel graphite or silicon carbide fibers aligned with the longitudinal side of the ply,
placing a tapered mandrel atop the longitudinal side of the ply so that the axis of the mandrel is aligned with the longitudinal side of the ply and the large diameter end of the mandrel is at the wide end of the ply,
rolling the mandrel across the ply, curing the ply on the mandrel, and removing the mandrel.

6. A method according to claim 5, wherein the resinous matrix is a heat-curable resin.

7. A method according to claim 6, wherein the heat-curable resin is an epoxy resin and the continuous contiguous parallel fibers are graphite.

8. A method according to claim 7, wherein the rod is constructed of a plurality of generally right triangular plies.

9. A method according to claim 8, wherein
a first generally right triangular ply is wrapped at least one time around the circumference of the mandrel,
a second generally right triangular ply is positioned atop the unrolled portion of the first ply with the axis of the mandrel aligned with the longitudinal side of the second ply and the large diameter end of the mandrel at the wide end of the second ply, and
the formation of the rod blank is completed by rolling the mandrel across the plurality of plies, curing the plies on the mandrel, and removing the mandrel.

* * * * *